Figure 1:
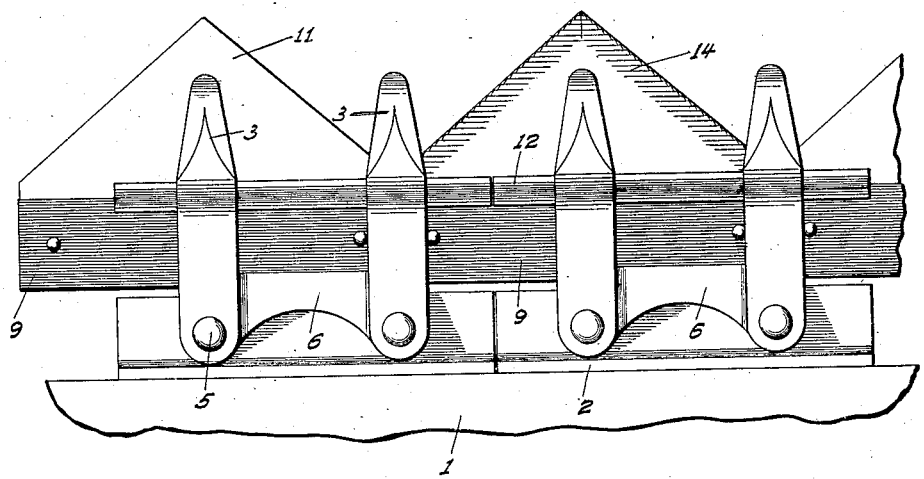

No. 888,491. PATENTED MAY 26, 1908.
C. G. HAMPTON.
CUTTER BAR AND GUARD.
APPLICATION FILED APR. 11, 1907.

2 SHEETS—SHEET 1.

Witnesses
Frank H. Artin
J. D. Webster

Inventor
Calvin G. Hampton,
By Percy D. Webster
Attorney

No. 888,491. PATENTED MAY 26, 1908.
C. G. HAMPTON.
CUTTER BAR AND GUARD.
APPLICATION FILED APR. 11, 1907.
2 SHEETS—SHEET 2.
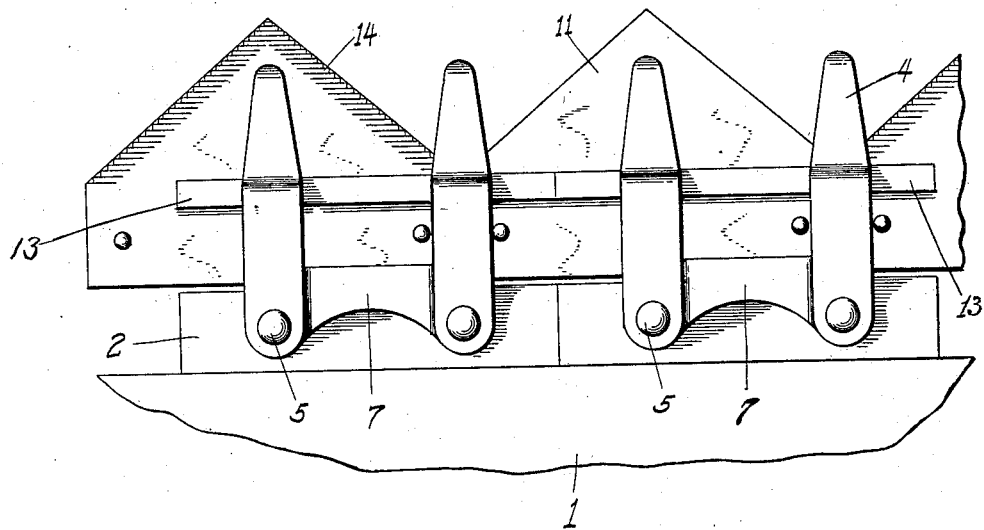
Witnesses
Frank H. Carter
J. W. Webster
Inventor
Calvin G. Hampton,
By Percy S. Webster
Attorney

UNITED STATES PATENT OFFICE.

CALVIN G. HAMPTON, OF RYDE, CALIFORNIA.

CUTTER BAR AND GUARD.

No. 888,491.  Specification of Letters Patent.  Patented May 26, 1908.

Application filed April 11, 1907. Serial No. 367,641.

*To all whom it may concern:*

Be it known that I, CALVIN G. HAMPTON, a citizen of the United States, residing at Ryde Station, in the county of Sacramento and State of California, have invented certain new and useful Improvements in Cutter Bars and Guards; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in farming implements, and particularly to the cutter bars and guards of headers, mowers and the like.

The object of the invention is to produce such a cutter bar as will be easily constructed, and one in which the knife guards will permit the knives to operate easily in said guards without choking or clogging as in guards ordinarily employed. This object I accomplish by means of open end guards and a smooth running slot for the cutter bars; also by such other and further construction as will appear by a perusal of the following specification and claims.

In the drawings similar characters of reference indicate corresponding parts in the several views.

Figure 2:
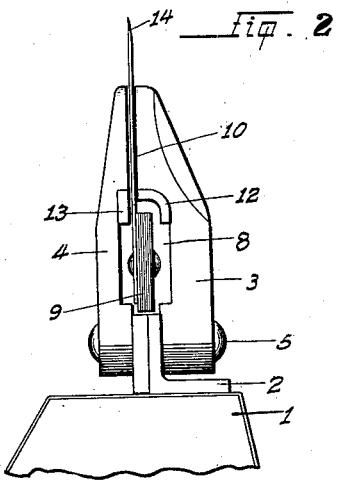
Figure 3:
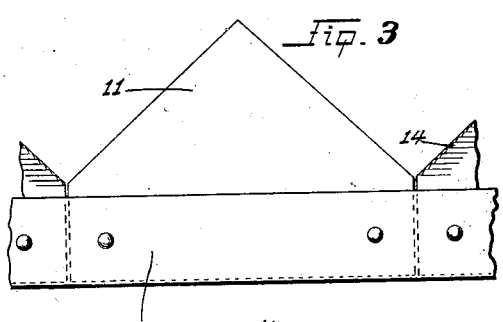
Figure 4:
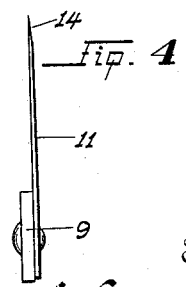

Figure 1 is a top plan view of a portion of a finger bar with my improved cutter bar and guards in connection therewith. Fig. 2 is an end elevation of the parts shown in Fig. 1. Fig. 3 is a top plan view of a portion of a cutter bar showing some of the knives secured thereto. Fig. 4 is an end elevation of a cutter bar showing one of the knives secured thereto. Fig. 5 is a bottom plan view of the parts shown in Fig. 1.

Referring more particularly to the reference numerals on the drawings 1 represents a portion of the finger bar. Secured to said finger bar are a series of angle irons 2, each angle iron having secured to the top thereof two finger guards consisting of upper members 3 and lower members 4, the same being joined to each other and to the irons 2 by means of rivets 5. Each set of members 3 are joined by bars 6 integral therewith, and the members 4 by similar bars 7.

The members 3 and 4 constituting the fingers are recessed on their inner faces to form a slot or space 8 between the members in which the cutter bar 9 works, this slot or space reducing at a point beyond the cutter bar 9 to a narrow slot or space 10 wide enough to permit easy working therein of the knives 11.

Outward from the members 3 at the forward end of the slots 8 are curved guards 12 extending longitudinally across from one member 3 to the other and cast solid to each set, those on each set being disposed end to end with those on the other as shown on Fig. 1.

13 are guards cast on the members 4 and disposed in a similar position as are the guards 12.

The knives 11 are formed with cutting edges 14, every other one of said knives having said edges on the under side thereof. Said knives 11 are suitably riveted to the bar 9 and extend slightly beyond the ends of the members 3 and 4, the said knives being so disposed on the bar 9 as to have the edges 14 alternately upward and downward as shown in the drawings.

The construction described permits of the knives moving easily between the members 3 and 4 without danger of clogging or choking as is the case with the return finger pieces now so commonly used. The guards 12 and 13 also permit the knives 11 to run free and prevent any choking or clogging between the fingers.

The feature of having the finger pieces and their parts connected in pairs by means of the bars 6 and 7 is also a very valuable one in that this holds the same very rigid, one acting as a brace for the other, and yet when one breaks or is rendered useless it does not necessitate the removal of the whole bar.

The feature of having the knives 11 extend beyond the fingers and of having the blades alternately up and down I find offers a better cutting means to the material to be cut, and cuts very smoothly and easily.

Thus it will be seen that I have produced such a device as substantially fulfils all the objects of the invention as set forth herein.

While this specification sets forth in some detail the present and preferred embodiment of my invention, still in practice many small deviations from such detail may be resorted to without departing from the spirit of the invention.

Having thus described my invention what

I claim as new and useful and desire to secure by Letters Patent is:—

1. In a device of the character described a finger bar, two piece finger guards connected therewith, said finger guards having central slots for receiving the cutter bar and smaller slots outward therefrom to the ends thereof, adapted to receive the knives, and guard members extending longitudinally of the finger bar between said guards and forming a slot registering with said last named slots, as specified.

2. In a device of the character described a finger bar, finger guards secured thereto, said guards being provided with central slots adapted to receive the cutter bar, smaller slots outward from said central slots and adapted to receive the knives, a cutter bar disposed in said central slots, knives secured to said cutter bar and operating through said last named slots, the alternate knives having upper and lower cutting edges respectively and guard members extending longitudinally of the finger bar between said finger guards and forming a slot registering with said last named slots, the top ones of said guard members curving over the top of said cutter bar, as set forth.

3. In a device of the character described, a finger bar, finger guards secured thereto, and each comprising two members, each member embodying a pair of fingers, bars connecting the fingers of each pair together, the said members being secured together and being secured to the finger bar, a cutter bar arranged between the members, guard members carried by said finger guards and extending longitudinally of the finger bar and between the finger guards, and knives carried by the cutter bar, the said knives of the cutter bar being secured thereon all on the same plane and the alternate knives having upper and lower cutting edges respectively.

In testimony whereof I affix my signature in presence of two witnesses.

CALVIN G. HAMPTON.

Witnesses:
PERCY S. WEBSTER,
FRANK H. CARTER.